(12) United States Patent
Sloan

(10) Patent No.: US 7,396,143 B2
(45) Date of Patent: Jul. 8, 2008

(54) RGB SPA LIGHT USING LIGHT EMITTING DIODES

(75) Inventor: Thomas C. Sloan, Santa Barbara, CA (US)

(73) Assignee: SloanLED, Inc., Ventura, CA (US)

( * ) Notice: Subject to any disclaimer, the term of this patent is extended or adjusted under 35 U.S.C. 154(b) by 238 days.

(21) Appl. No.: 11/117,910

(22) Filed: Apr. 29, 2005

(65) Prior Publication Data

US 2005/0248944 A1 Nov. 10, 2005

Related U.S. Application Data

(60) Provisional application No. 60/567,366, filed on Apr. 29, 2004.

(51) Int. Cl.
*F21V 23/04* (2006.01)
*F21S 13/14* (2006.01)
*H05B 33/08* (2006.01)

(52) U.S. Cl. ............ 362/251; 362/101; 362/231; 362/234

(58) Field of Classification Search ........... 362/230, 362/231, 251, 101, 145, 234
See application file for complete search history.

(56) References Cited

U.S. PATENT DOCUMENTS 4,617,615 A 10/1986 Eychaner ............ 362/216
5,051,875 A 9/1991 Johnson ............ 362/101
5,122,936 A 6/1992 Gutherie ............ 362/101
6,616,291 B1 * 9/2003 Love ............ 362/101
6,659,622 B2 * 12/2003 Katogi et al. ............ 362/231
6,676,284 B1 * 1/2004 Wynne Willson ............ 362/231
6,690,120 B2 * 2/2004 Oskorep et al. ............ 315/178
6,781,329 B2 * 8/2004 Mueller et al. ............ 315/297

* cited by examiner

*Primary Examiner*—Alan Cariaso
(74) *Attorney, Agent, or Firm*—Koppel, Patrick, Heybl & Dawson

(57) ABSTRACT

A lighting system comprising a central controller for generating control signals and one or more lighting subsystems each of which accepts the control signals from the controller. Each of the subsystems comprises first and second lighting units connected in series. Each of the lighting units comprises a plurality of emitting diodes (LEDs), each being a different type emitting a different color of light. Each of said lighting units has a power lead and a respective lead from each of its LEDs. Each of the lighting units comprises similar types of LEDs emitting similar colors of light. Electronic circuitry is included, some of which is arranged between the first and second serially connected lighting units. The electronic circuitry accepts the controller control signals corresponding to power and each of said type of the LEDs. The control signals and electronic circuitry are arranged to cause one or more pairs of the corresponding similar LEDs types in said LED units to emit light.

26 Claims, 7 Drawing Sheets

RGB SPA LIGHT USING LIGHT EMITTING DIODES

This application claims the benefit of provisional application Ser. No. 60/567,366 to Sloan et al., which was filed on Apr. 29, 2004.

BACKGROUND OF THE INVENTION

1. Field of the Invention

This invention relates to the lighting of pools, spas, and the like, and more particularly to lighting using light emitting diodes (LEDs).

2. Description of the Related Art

Reservoirs of water such as pools and spas are commonly constructed with one or more underwater light sources for illuminating the water within the reservoir. The light sources are visually appealing and the illumination of the water allows for safe use of the pool or spa at night. Conventional lighting units are commonly mounted on the wall of the pool or spa, and comprise a watertight housing that contains an incandescent light source.

A number of variations to the conventional pool or spa light have been developed. See U.S. Pat. No. 4,617,615 to Eychaner, U.S. Pat. No. 5,122,936 to Guthrie, and U.S. Pat. No. 5,051,875 to Johnson. One disadvantage of the lights disclosed in these patents is that each uses an incandescent, fluorescent or quartz light source. The life of these light sources is relatively short which results in periodic maintenance to replace the failed light sources. The cost of additional light sources and the periodic maintenance can add additional costs and the maintenance can be difficult to accomplish because the lights are usually below the water surface.

Fiber optic lighting systems have been developed for spas by, among others, Coast Spas located in British Columbia, Canada. The system includes a remote light source and numerous optical fibers directed toward a number of holes in the spa wall. Each hole has a cap to hold one of the optical fibers so that the light emitting from the end of the fiber is directed through the cap and into the water within the spa. Each cap has a transparent lens that disperses or focuses the light from the fiber.

One disadvantage of these systems is that the remote light source is prone to failure and can require regular maintenance. The light source generally comprises an incandescent bulb and a color wheel that is turned by a mechanical mechanism. The wheel has sections of different colors and the light from the bulb is directed through the wheel where it is changed to the particular color of the wheel section it passes through. The light then enters the optical fibers and is transmitted to the interior of the spa. As the wheel turns, the different sections having different colors pass in front of the light source, changing the color passing into the optical fibers. The incandescent bulb has a relatively short life and the mechanical components of the wheel can fail or require maintenance.

SUMMARY OF THE INVENTION

One embodiment of a lighting subsystem according to the present invention comprising control lines each of which accepts one of a plurality of control signals from a controller. First and second lighting units are included connected in series, each of which comprises a plurality of light emitting diodes (LEDs) each being a different type and emitting different colors of light. Each of the lighting units has a power lead and a respective lead from each of its LEDs and each of the lighting units comprises similar types of LEDs emitting at similar colors of light. Electronic circuitry in included some of which is arranged between said first and second serially connected lighting units. The electronic circuitry accepts the control signals on the control lines, with the control signals corresponding to power and each of LED types. The control signals and electronic circuitry are arranged to cause one or more pairs of corresponding LEDs types in the lighting units to emit light.

One embodiment of a lighting system according to the present invention comprises a central controller for generating control signals and one or more lighting subsystems each of which accepts the control signals from said controller. Each of the subsystems comprises a plurality of lighting units, each of which comprises a plurality of light emitting diodes (LEDs), each being a different type emitting a different color of light. Each of the lighting units comprising LED types emitting the same colors of light. The system also includes electronic circuitry comprising a plurality of switches. Each of the LEDs in the first of the plurality of lighting units is connected between a drive voltage and a respective one of the switches. The switches also connected to a node. A second of the lighting units is also included, each of the LEDs in the second lighting unit connected to the node. The control signals closing the desired ones of the switches and applying the appropriate signal to the LEDs in the second of the lighting units to cause one or more corresponding type of the LEDs in the lighting units to emit light.

Another embodiment of a lighting system according to the present invention comprises a central controller for generating control signals and one or more lighting subsystems each of which accepts the control signals from the controller. Each of the subsystems comprises first and second lighting units connected in series. Each of the lighting units comprises a plurality of emitting diodes (LEDs), each being a different type emitting a different color of light. Each of said lighting units has a power lead and a respective lead from each of its LEDs. Each of the lighting units comprises similar types of LEDs emitting similar colors of light. Electronic circuitry is included, some of which is arranged between the first and second serially connected lighting units. The electronic circuitry accepts the controller control signals corresponding to power and each of said type of the LEDs. The control signals and electronic circuitry are arranged to cause one or more pairs of the corresponding similar LEDs types in said lighting units to emit light.

One embodiment of a system for illuminating a reservoir of water according to the present invention comprises a reservoir shell capable of holding water and at least one reservoir component extending through said reservoir shell. A central controller is included for generating control signals and one or more lighting subsystems each of which accepts the control signals from the controller. Each of the subsystems comprises first and second lighting units connected in series. Each of the lighting units comprises a plurality of emitting diodes (LEDs), each being a different type emitting a different color of light. Each of said lighting units has a power lead and a respective lead from each of its LEDs. Each of the lighting units comprises similar types of LEDs emitting similar colors of light. Electronic circuitry is included, some of which is arranged between the first and second serially connected lighting units. The electronic circuitry accepts the controller control signals corresponding to power and each of said type of the LEDs. The control signals and electronic circuitry are arranged to cause one or more pairs of the corresponding similar LEDs types in said lighting units to emit light.

These and further features and advantages of the invention will be apparent to those skilled in the art from the following detailed description, taken together with the accompanying drawings, in which:

DETAILED DESCRIPTION OF THE INVENTION

The present invention provides an improved lighting system for illuminating the water within a pool, spa or other water reservoir, all of which will be referred to collectively as a "spa". The present invention is described below in relation to spa lighting. It should be understood, however, that the invention can be used in many different lighting applications beyond spa lighting.

The lighting system comprises RGB LED units, each of which has a red, green and blue LED. To keep the size and diameter of the RGB LED units relatively small, each has only four leads, one for power, and one lead for each of the red, green and blue LEDs. Instead of each RGB LED unit being controlled by its own set of control lines, multiple units can be controlled by a single set of control lines. The control signals are conducted to a node, such as a printed circuit board, and then branch off to each of a plurality of RGB LED units. The plurality of RGB LED units are divided into groups of two or more units that are serially coupled together and are controlled by a single set of control lines.

Conventional spas utilize fiber optic lighting systems that can be expensive, fragile and comprise in light source and a mechanical color wheel that are prone to failure. By using LEDs as the light source and electronic components to control the color of illumination, the life and reliability of the lighting systems is improved over conventional lighting systems. The branching arrangement reduces the number of control lines that are necessary to control the RGB LED units. If control lines were provided between the control system and each of the RGB LED units, the cost and complexity of the lighting system would be prohibitive. The space needed for the lighting system and the resulting weight of the spa could also be excessive. Also, if all the RGB LED units were connected in parallel from the PCB, a prohibitive amount of current would be needed to drive the LEDs. By arranging the RGB LED units in serially connected groups, the necessary current is greatly reduced.

It will be understood that when an element or component is referred to as being "on", "connected to", "coupled to" or "in contact with" another element or component, it can be directly on, connected or coupled to, or in contact with the other element or component or intervening elements or components may be present. In contrast, when an element is referred to as being "directly on," "directly connected to", "directly coupled to" or "directly in contact with" another element or component, there are no intervening elements or components present.

Figure 1:
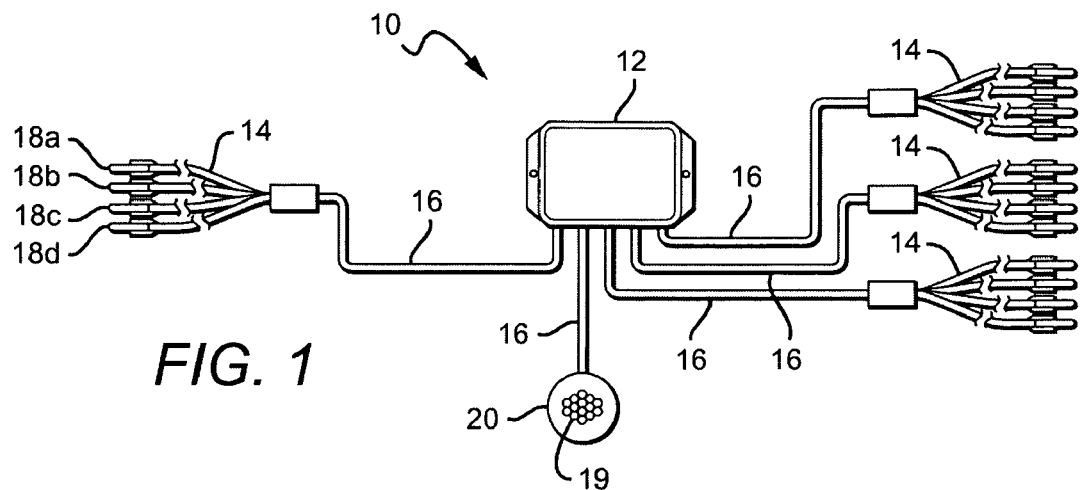
FIG. 1 is a plan view of one embodiment of a hub and spoke lighting system according to the present invention.

FIG. 1 shows one embodiment of a red, green and blue LED type lighting system 10 according to the present invention in a "hub and spoke" arrangement. The system 10 comprises a central controller 12 having electronic components and software to generate lighting control signals. The system 10 also comprises lighting subsystems 14, each of which is coupled to the central controller 12 by a respective cable 16, providing the hub and spoke type arrangement. Each of the cables 16 accepts control signals from the central controller 12 and conducts them through its subsystem as further described below. The system 10 is shown with four subsystems, but it is understood that the system 10 can also comprise fewer or more lighting subsystems 14 and can be interconnected in different ways. Each of the subsystems 14 comprises four red, green and blue (RGB) light emitting diode (LED) units 18a-d, although it is understood that each of the subsystems 14 can have more or fewer RGB LED units 18a-d. Each of the units 18a-d is capable of emitting red, green or blue light, or combinations thereof, under control of the central controller 12.

The central controller 12 is typically powered by the power from the spa's electrical system, which in one embodiment may be 12 volts alternating current (AC). The controller can contain the circuitry to accept 12v AC and rectify it to 12v direct current (DC) to drive the RGB LED units 18a-d.

The system 10 also comprises a LED lamp 20 that has a number of combined RGB LED units 19 held together such that the light 20 emits the combined luminous flux of the units 19. The light 20 is coupled to the central controller 12 by a cable 16 and the light emits under control of the central controller. When the system 10 is installed in a spa, the units 18a-d and light 20 illuminate the interior of that spa either by shining though a lens of a flood light or point light, or through one of the spa components such as a jet, waterfall, drains, skimmers, etc.

Figure 2:
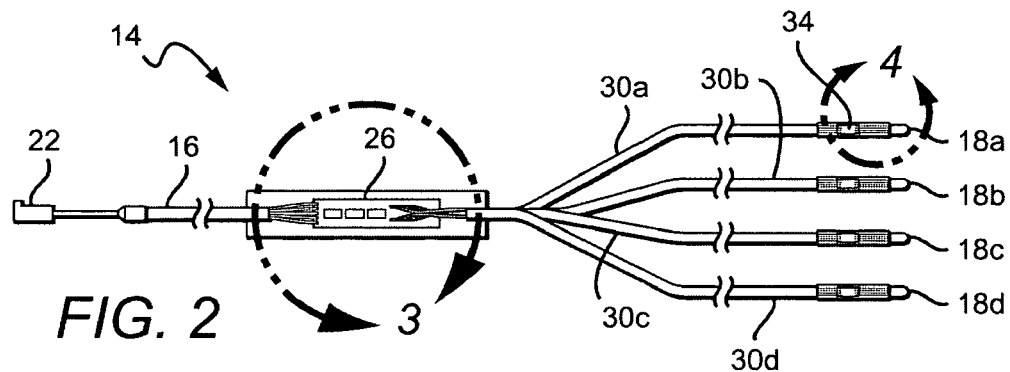
FIG. 2 is a plan view of one embodiment of an RGB LED lighting subsystem according to the present invention that can be used in the lighting system of FIG. 1.
Figure 3:
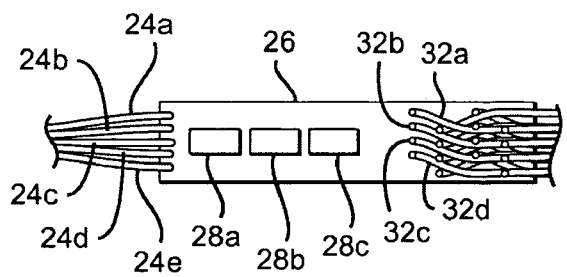
FIG. 3 is a plan view of one embodiment of a printed circuit board (PCB) that can be used in an RGB LED lighting subsystem in FIG. 2.
Figure 4:
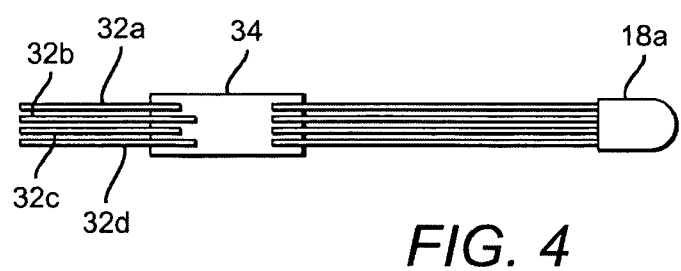
FIG. 4 shows a detailed plan view of a connection arrangement between the PCB of FIG. 3 and one of the RGB LED units.

FIGS. 2-4 show one embodiment of an RGB LED lighting subsystem 14 according to the present invention comprising four RGB LED units 18a-d. Each of the RGB LED units 18a-d comprises red, green and blue LEDs, and each has four control lines; one to carry power and three to carry signals to control the emission of red, green or blue either separately or simultaneously. When more than one color is emitted simultaneously, the respective unit emits a combination of the emitted colors. At the end opposite the lighting units 18a-d, the subsystem 10 comprises a controller connector 22 coupled to the cable 16 and arranged to connect to the central controller to accept control signals.

The cable 16 comprises five control lines 24a-e (best shown in FIG. 3) each of which comprises an electrical conductor capable of carrying an electrical signal from the central controller 12. Different types of electrical conductors can be used, with a suitable electrical conductor for each of the control lines 24a-e being 24 AWG wire. The control lines 24a-e can be arranged in many different ways, with a preferred arrangement having the control lines 24a-e conducting a voltage high (Vdd-12 volts DC), a voltage low (Vss Gnd), red LED control, green LED control, and blue LED control.

Control lines 24a-e are coupled to a PCB 26 (best shown in FIG. 3), which contains electronic devices 28a-c to generate control signals that allow the RGB LED units 18a-d to be coupled in series pairs according to the present invention, although it is understood that more than two units can be connected in series and controlled by signals from the electronic devices 28a-c in combination with the control signals from the central controller. Whichever of the two RGB LED units 18a-d are coupled in series, the other two of the RGB LED units 18a-d can also be coupled in a separate series arrangement. As more fully described below in reference to FIGS. 5-7, the electronic devices 28a-c can comprise different devices in different embodiments such as in one embodiment invert, switching, and discrete elements such as resistors. The PCB 26 comprises conductive traces to interconnect the electronic devices 28a-c.

Control signals are conducted from the PCB 26 to the RGB LED units 18a-d by four LED unit control line cables 30a-d, each of which is arranged to carry the same control signals although in other embodiments they can carry different signals. Each of the LED control line cables 30a-d contains four LED conductors 32a-d (best shown in FIG. 3) and different types of conductors can be used, with suitable conductors being arranged as four conductor modular cable wire, with 26 AWG wires.

As more fully described below in reference to FIGS. 5-7, three of the four LED conductors 32a-d in each of control line cables 30a-d conducts signals that control the illumination of the red, green and blue LEDs in its respective one of the RGB LED units 18a-d. The fourth one of the conductors 32a-d in each of the LED control line cables 30a-d has a different function depending on whether its respective one of the RGB LED units 18a-d is first or second in its series connection with its other unit. If it is first in the series, then the fourth conductor carries a voltage high (Vdd 12VDC). If it is second in the series, it carries a signal from the first of the RGB LED units 18a-d, to the second.

The four conductors 32a-d of each of the LED control line cables 30a-d is coupled to a respective one of the RGB LED units 18a-d through a respective one of the connector boards 34 (best shown in FIG. 4). Each of the connector boards 34 includes conductive traces, with the conductors 32a-d in its respective one of the control line cables 30a-d coupled to one end of the traces and the four leads of its respective one of the RGB LED units 18a-d coupled to the other end. Each of the connector boards 34 can then be conformal coated to protect its connection points and traces. Many different conformal coats can be used, with a suitable conformal coat being Humiseal 1878 or an equivalent. After conformal coating, each of the boards 34a-d and its connected conductors is covered by shrink wrap tubing using conventional methods. When the units 18a-d are finally fabricated, each should be capable of being inserted in a hole in the range of 0.190 to 0.210 inches in diameter or less, to allow the system 10 to replace most fiber optic lighting systems.

The branching arrangement of the control line sets 30a-d from the PCB 18 eliminates much of the redundancy in a conventional system that would include control lines from the control system to each of the RGB LED units. This reduces the cost and complexity of the system and also reduces the space needed for the system and the resulting weight of the spa. The system also reduces the amount of current needed to drive the RGB LED units.

Figure 5:
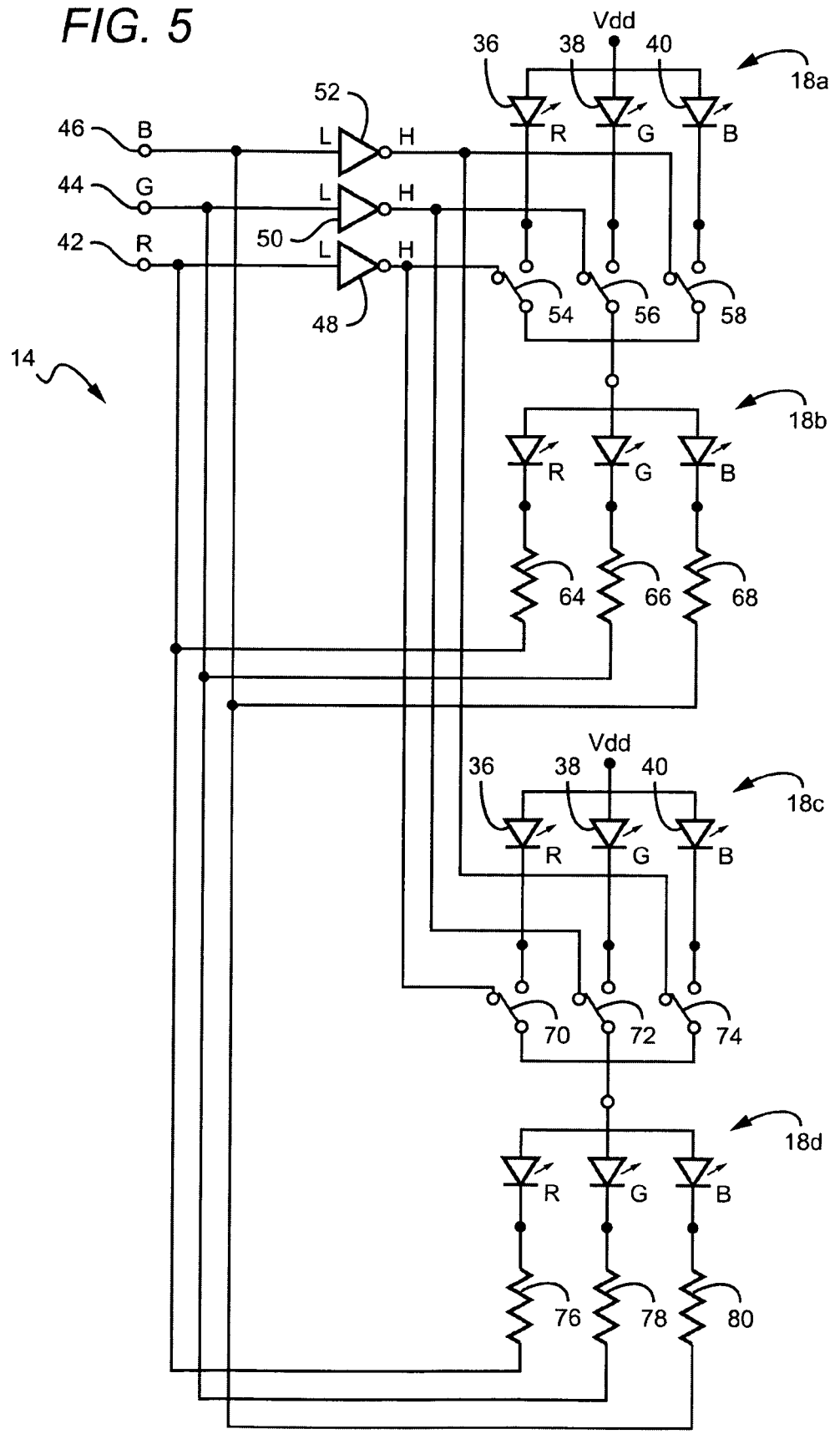
FIG. 5 is a schematic of the components and interconnections in one embodiment of an RGB LED lighting subsystems according to the present invention.

FIG. 5 shows the components and interconnections for one embodiment of a lighting subsystem 14 according to the present invention. The subsystem 14 has four RGB LED units 18a-d, with the first two RGB LED units 18a, 18b connected in series, and the other two units 18c, 18d separately connected in series. Each of the RGB LED units 18a-d comprises a red emitting LED 36, a green emitting LED 38, and a blue emitting LED 40, the illumination of which is controlled by central controller 12 (shown in FIG. 1). Red, green and blue control lines 42, 44, 46 carry signals from the control system that control the illumination of the red, green and blue LEDs 36, 38, 40. The control signals 42, 44, 46 are active low, i.e. a low signal on one of the control lines 42, 44, 46 causes its respective color of LED to emit light. For example, a low on the green control line 44 causes the green LEDs 38 in the RGB LED units 18a-d to emit light.

Each of the red, green and blue control lines 42, 44, 46 are coupled to its respective one of the red, green and blue inverters 48, 50, 52, typically residing on the PCB 26 shown in FIGS. 2 and 3. The output of the red, green and blue inverters 48, 50, 52, controls the opening of a respective one of first red, green and blue switches 54, 56, 58, which are arranged between RGB LED unit 18a and unit 18b and can also typically be found on the PCB 26. For example, the output of the green inverter 50 controls the green switch 56; a high from the inverter 50 closes the switch 56 and low opens the switch 56.

Each of the red, green and blue control lines 42, 44, 46 are also coupled to its respective one of a first red, green and blue resistor 64, 66, 68, with the other lead of the resistors 64, 66, 68 coupled to its respective red, green and blue LED 36, 38, 40 in RGB LED unit 18b.

The outputs of the red, green and blue inverters 48, 50, 52 similarly control the opening of second red, green and blue switches 70, 72, 74 between RGB LED units 18c and unit 18d. Each of the red, green and blue control lines 42, 44, 46 are also similarly coupled to respective second red green and blue resistors 76, 78, 80, with the other leads of the resistors coupled to its respective red, green and blue LED 36, 38, 40 in RGB LED unit 18d.

In operation, the central controller 12 provides a low signal (or a series of low signals) to the red, green and/or blue control lines 42, 44, 46 corresponding to the red, green and/or blue LED 36, 38, 40 that is to emit light. For example, to emit green light at the RGB LED units 18a-d, the signal (from the central controller) at control line 44 is low, and the signal at control lines 42 and 46 is high. Referring now to the operation of a RGB LED units 18a and 18b, the low at control line 44 is converted to a high at inverter 50, and the highs at control lines 42 and 46 are converted to lows at inverters 48 and 52, respectively. The high from inverter 50 causes the first green switch 56 to close, and the lows from inverters 48 and 52 cause the first red and blue switches 54, 58 to open. The low at control line 44 is also coupled to the first green resistor 66 and the highs from control lines 42 and 46 are coupled to first red and blue resistors 64, 68, respectively.

The low at the first green resistor 66 completes the circuit from Vdd, through the green LED 38 in RGB LED unit 18a, through the closed first green switch 56, through the green LED 38 in RGB LED unit 18b and through the low at first green resistor 66. This causes current to flow through the circuit and causes the green LEDs 38 in RGB LED units 18a and 18b to emit light. Because of the open first red and blue switches 56, 58 and the high at first red and blue resistors 64, 68, no current flows through the red and blue LED 36, 40 and they do not emit light.

The RGB LED unit 18c and unit 18d operate similarly to illuminate their green LEDs 38. A low at the red or blue control lines 42 and 46 would similarly cause the red and blue LEDs 36, 40 in the RGB LED units 18a-d to emit light.

By connecting the four RGB LED units 32a-d in two sets of serially connected units, the current necessary to drive the LEDs is reduced. This reduces the current needed to drive the overall lighting subsystem 14, and in turn to drive lighting system 10. The number of control lines is also reduced.

Figure 6:
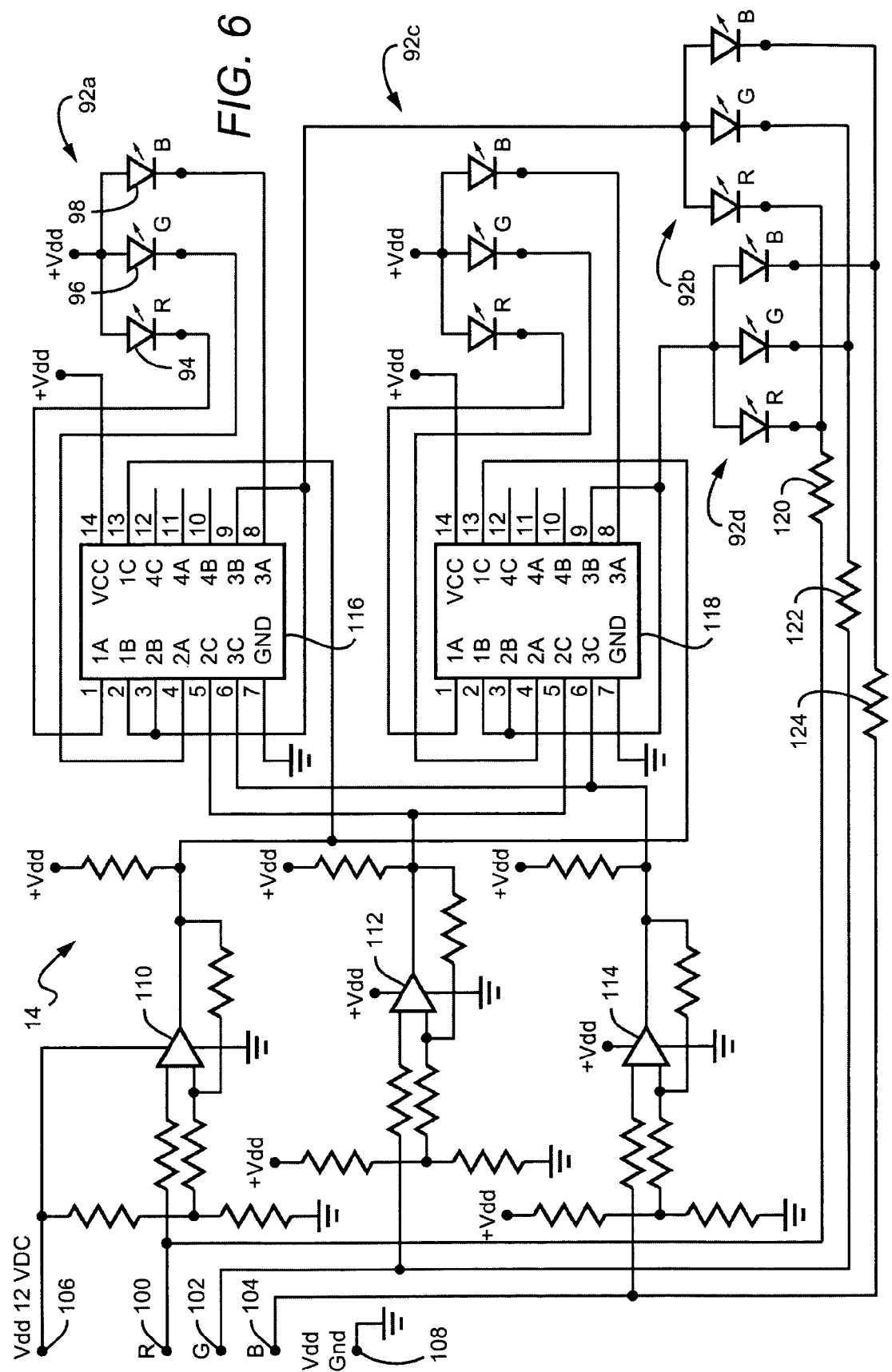
FIG. 6 is a schematic of the components and interconnections in another embodiment of an RGB LED lighting subsystems according to the present invention.

FIG. 6 shows the components and interconnections for another embodiment of a lighting subsystem 14 according to the present invention having four RGB LED units 92a-d. Like the lighting system in FIG. 5, RGB LED units 92a and 92b are connected in series and RGB LED units 92c and 92d are connected in series. Each of the RGB LED units 92a-d have red, green and blue illuminating LEDs 94, 96, 98. Red, green and blue control lines 100, 102, 104 carry signals from the control system that control the illumination of the red, green and blue LEDs 94, 96, 98. High and ground control lines 106, 108 carry a voltage high (Vdd 12 VDC) and ground, respectively. The system accepts a total of five control lines including the red, green and blue control lines, and the high and ground 106, 108. The ground 108 is primarily necessary for grounding the integrated circuits described below.

The system 90 also comprises red, green and blue inverters 110, 112 and 114, and first and second switching integrated circuits (IC or ICs) 116, 118. Similar to the system 30 in FIG. 4, the system 90 is an active low system, i.e. a low at one of the red, green and blue control lines 94, 96, 98, causes the corresponding LEDs in the RGB LED units 92a-d to emit light. Many different circuits or devices can be used for inverters 110, 112, 114, with the preferred circuit as shown being a comparator circuit that inverts the signal provided by its respective one of the control lines 100, 102, 104. Comparator circuits are well known in the art and will not be described in further detail herein.

The first switching IC 116 provides a switch for each of the red, green and blue LEDs 94, 96, 98 in RGB LED 92a, with each of the LEDs 94, 96, 98, coupled between its respective switch and Vdd. The second switching IC 118 similarly provides a switch for each of the red, green and blue LEDs 94, 96, 98 in RGB LED 92c with each LED 94, 96, 98 also coupled between its respective switch and Vdd. The switches in switching ICs 116, 118 can be provided by many different discrete or integrated circuits, with the preferred switches being provided on a CD4066B CMOS Quad Bilateral Switch, provided by Texas Instruments.

The output of each inverter 110, 112, 114, controls a respective switch on first IC 116 and respective switch on second IC 118. For example, the first switch on IC 116 has control pin 1C, input pin 1A, and output pin 1B. The output of the red inverter 110 is coupled to the control pin 1C and the output of the red LED 94 on RGB LED unit 92a is coupled between the input pin 1A and Vdd. When the red control line 100 carries a low to the red inverter 110, a high is coupled to the control pin 1C, which closes the first switch. By closing the first switch, the input pin 1A is coupled to the output pin 1B. The first IC has second and third switches that work the same way with the green and blue inverters 112, 114, respectively. The second IC 118 functions in the same way with the inverters 110, 112, 114 and the red, green and blue LEDs on RGB LED unit 92c.

The red, green and blue control lines 100, 102, 104 are also coupled to the red, green and blue resistors 120, 122, 124. The other leads of the resistors are coupled to the red green and blue LEDs 94, 96, 98 in RGB LED units 92b and 92d.

The operation of subsystem in FIG. 6 is similar to the operation of subsystem in FIG. 5. For example, a low at the red control line 100 closes the first switch in the first and second ICs 116, 118 and results in a low at the red resistor. This completes a circuit in the serially connected RGB LED units 92a and 92b, and in the serially connected RGB LED units 92c and 922. For RGB LED units 92a and 92b, the circuit is completed from Vdd, through the red LED 94 in RGB LED unit 92a, through the closed first switch on first IC 116, through the red LED 100 in RGB LED unit 92b and through the low at first red resistor 120. This causes current to flow through the circuit and causes the red LEDs 94 in RGB LED units 92a and 92b to emit light. RGB LED units 92c and 92d operate the same way and the green and blue LEDs 96, 98 can be similarly illuminated.

Many of the components and interconnects in system 90 are shown in the subsystem 14 of FIGS. 2 and 3. The inverters 110, 112, 114 and ICs 116, 118 are shown as electronic devices 28a-c on PCB 20 in subsystem 14. Control lines 94, 96, 98, 100, 102 are shown as control lines 24a-e between the connector 22 and the PCB 26 in subsystem 14. The four conductors 32a-d in LED control line cable 30a can correspond to Vdd and three lines between the red, green and blue LEDs 94, 96, 98, on RGB LED unit 92a and the first switching IC 116. The four conductors 32a-d in LED control line cable 30b can correspond to the line that carries the output of the switches on first IC 116, to the red green and blue LEDs 94, 96, 98 on RGB LED unit 92b and the lines between the red, green and blue LEDs 94, 96, 98 and the red, green and blue resistors 120, 122, 124, respectively. The conductors 32a-d in LED control line cables 30c and 30d correspond to similar lines in RGB LED units 92c and 92d and second IC 118.

Figure 7:
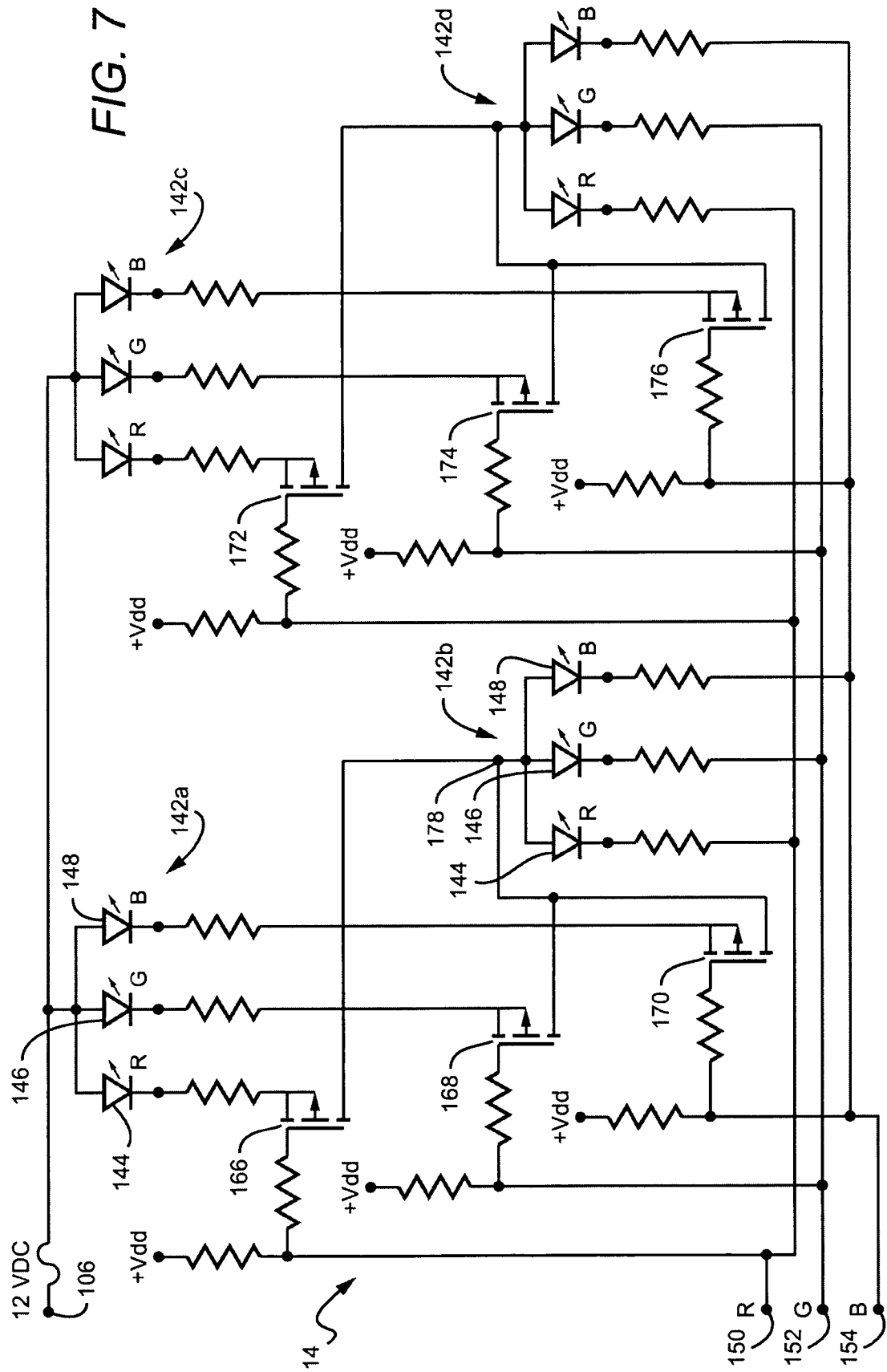
FIG. 7 is a schematic of the components and interconnections in still another embodiment of an RGB LED lighting subsystems according to the present invention.

FIG. 7 shows the components and interconnections for still another embodiment of a lighting subsystem 14 according to the present invention having four RGB LED units RGB LED units 142a-d. Like the lighting systems in FIGS. 5 and 6, RGB LED units 142a and 142b are connected in series and RGB LED units 142c and 142d are connected in series. Each of the RGB LED units 142a-d have red, green and blue illuminating LEDs 144, 146, 148. Red, green and blue control lines 150, 152, 154 carry signals from the central controller that control the illumination of the red, green and blue LEDs 144, 146, 148.

Instead of using inverters and ICs as are used in the subsystem 14, the subsystem of FIG. 7 utilizes first red, green and blue field effect transistors (FETs) 166, 168 and 170 for lighting units 142a and 142b, and second red, green and blue FETs 172, 174, 176. The subsystem 14 in FIG. 7 is an active low system, i.e. a low at one of the red, green and blue control lines 150, 152, 154, causes the corresponding LEDs in the RGB LED units 142a-d to emit light.

The first red, green and blue FETs 166, 168, 170 are connected to the red, green and blue LEDs 144, 146, 148, respectively, in RGB LED unit 142a, with each of the LEDs 144, 146, 148, coupled between its respective FET and 12 VDC. The second red, green and blue FETs 172, 174, 176 are similarly connected to its one of red, green and blue LEDs 144, 146, 148 in RGB LED 142c with each LED 144, 146, 148 coupled between its respective FETs and 12 VDC. Many different FETs can be used in system 150, with a suitable FET being a commercially available BSS84/BSS110 P-Channel Mode FET provided by Fairchild Semiconductor.

Each of the control lines 150, 152, and 154 controls a respective one of the first red, green and blue FETs 166, 168, 170. For example, red control line 160 carries a low (active) to the gate of the red FET, current flows from the source to the drain. The red LED 144 in unit 142b is connected between the first node 178 and the low at the red control 160. This completes the circuit with from 12VDC, through the red LED 144 in unit 142a, the red LED 144 in unit 142b and back to the low and red control 160. This allows the red LEDs 144 in units 142a and 142b to illuminate. The green and blue control lines 162, 164 can similarly carry a low to cause the green or blue LEDs 146 and 148 in units 142a, 142b to illuminate. The red, green and blue control lines 150, 152, 154 are also coupled to second red, green and blue FETs 172, 174, 176 to similarly control the illumination of the red, green and blue LEDs 144, 146, 148 in units 142c and 142d.

In contrast to the subsystem 14 shown in FIG. 6, the subsystem 14 in FIG. 7 utilizes only four control signals from the central controller; red, green and blue control 150, 152, 153 and 12 VDC. The ground control line is not necessary primarily because the subsystem in FIG. 7 does not rely on integrated circuits.

Figure 8:
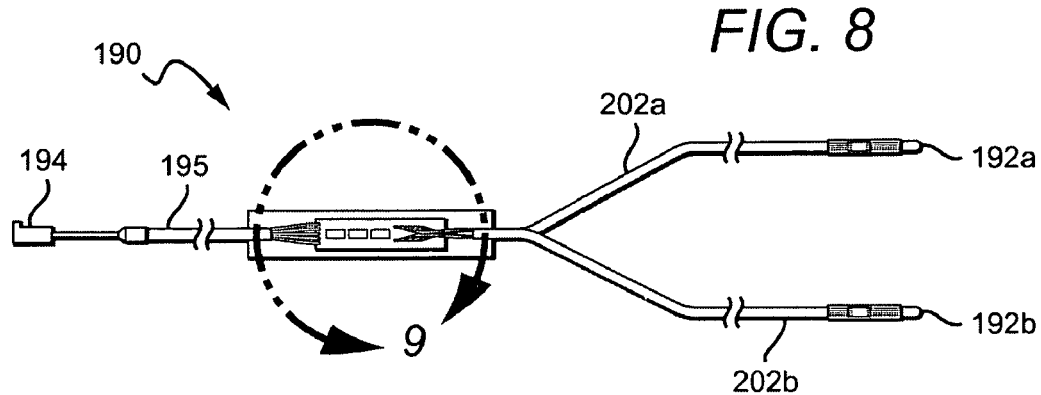
FIG. 8 is a plan view of one embodiment of a two RGB LED unit lighting subsystem according to the present invention that can be used in the lighting system of FIG. 1.
Figure 9:
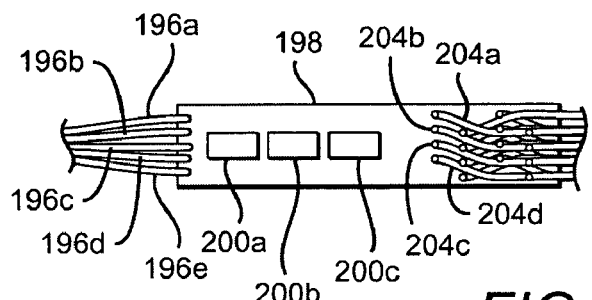
FIG. 9 is a plan view of one embodiment of a printed circuit board (PCB) that can be used in the lighting subsystem in FIG. 8.

FIGS. 8 and 9 show another embodiment of a lighting system 190 according to the present invention, which is similar to the subsystem 14 described above, but comprises two serially connected RGB LED units 192a, 192b, instead of four. It comprises a similar control system connector 194 and a cable 195 having five control system control lines 196a-e, three for the red, green and blue colors, one for voltage high, and one for ground. Accordingly, the subsystem 190 is particularly adapted for use with electronic components and interconnects as shown in FIG. 6 and require a ground control line. It is understood the subsystem 190 can equally be used with other components and interconnects and the corresponding control lines.

The subsystem 190 comprises a similar PCB 198 having electronic components 200a-c for the inverters and switching circuitry. The system comprises two LED control line sets 202a, 202b instead of four, each of which comprises four conductors 204a-d. The subsystem 190 functions the same as the first series connected RGB LED units 18a, 18b in FIG. 5, 92a, 92b in FIG. 6, and 142a, 142b in FIG. 7. The primary difference with subsystem 190 is that because it comprises only two serially connected RGB LED units 192a, 192b, only one set (or one half) of electronic components shown in FIGS. 5-7 is needed on the PCB and only two LED control line cables are needed.

Figure 10:
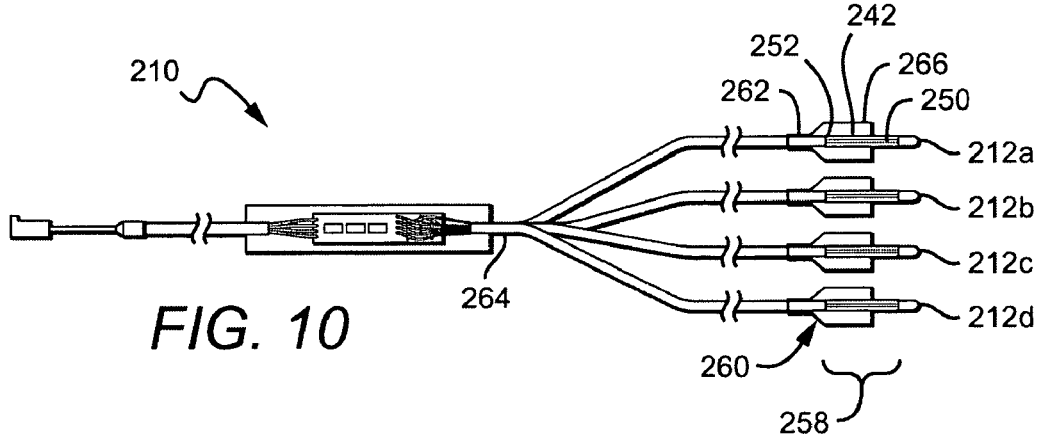
FIG. 10 is a plan view of another embodiment of a four RGB LED lighting subsystem according to the present invention that can be used in the lighting system of FIG. 1.
Figure 11:
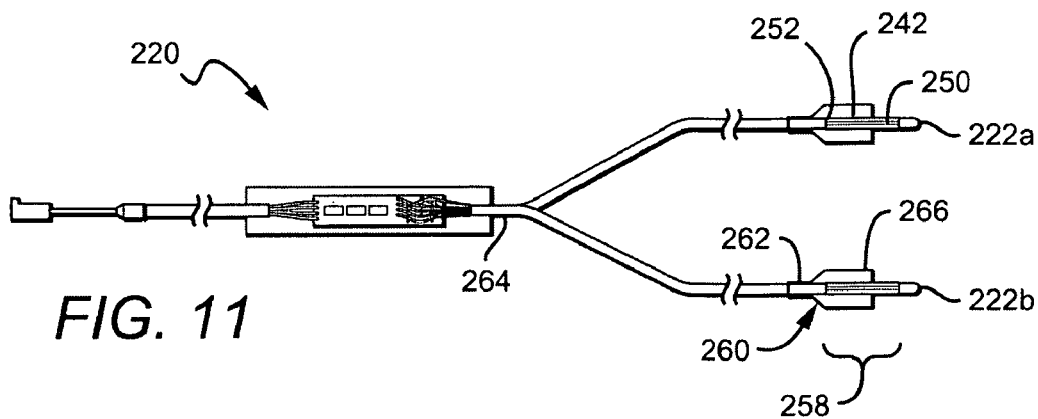
FIG. 11 is a plan view of another embodiment of a two RGB LED lighting subsystem according to the present invention that can be used in the lighting system of FIG. 1.
Figure 12:
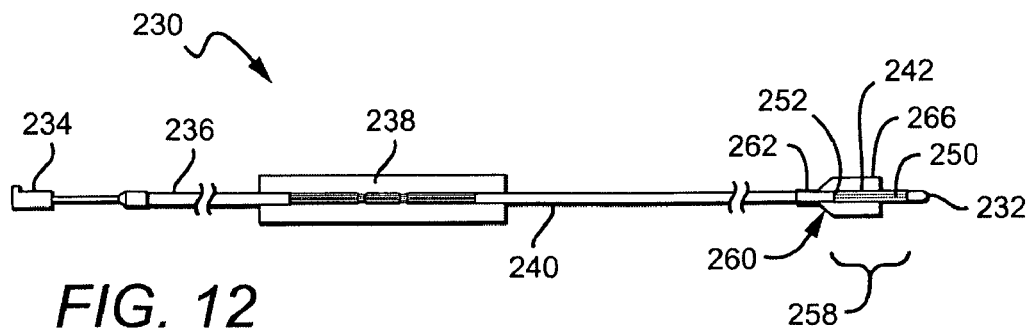
FIG. 12 is a plan view of one embodiment of a single RGB LED lighting subsystem according to the present invention that can be used in the lighting system of FIG. 1.

FIG. 10 shows another embodiment of a lighting subsystem 210 according to the present invention that is similar to the lighting subsystem 14 shown in FIG. 2, and also has four RGB LED units 212a-d that can be interconnected as shown in FIG. 5-7. FIG. 11 shows a lighting subsystem 220 that is similar to the lighting subsystem 190 and has two RGB LED units 222a, 222b. Subsystems 210 and 220 can be used in the hub and spoke lighting system described above and shown in FIG. 1. FIG. 12 shows another embodiment of a lighting subsystem 230 according to the present invention having a single RGB LED unit 232 that can also be used in a hub and spoke lighting system. The subsystem 230 has a controller connector 234, cable 236, PCB 238 and LED unit control lines 240. Because Subsystem 230 only has one RGB LED unit, it does not need the electronic circuitry discussed above in FIGS. 5-7. Instead, the control signal from the central controller can be sent directly to the RGB LED unit 232. The PCB 238 contains traces, and electronic devices such as fuses and/or resisters necessary for connecting the control lines 236 to the LED unit control lines 240. The single RGB LED unit subsystem 230 provides flexibility in arranging the hub and spoke lighting system to match the particular application.

Each of the connection points in subsystems 210, 220 and 230 between the leads 250 of the RGB LED units and the LED unit conductors 252 and LED unit control lines are covered by heat shrink tubes. In the subsystem 14 described above in FIGS. 2-4, the entire connection area is then covered by another larger shrink wrap tube. To provide a more robust and reliable connection between the leads 250 and conductors 252, the connection area is covered by an over mold 242 that can be made of many different materials, but is preferably made of a plastic such as polyvinyl chloride (PVC).

The connection area can be covered by PVC using many different methods, with a preferred method being injection molding. After each of the four connection points are covered with a heat shrink tube as described above, the connection area 258 is then placed in an injection mold fixture. Molten PVC is then injected into the mold fixture to cover the connection area 258 to form the over mold 242. The molten PCV should be at a temperature low enough so that is does not cause damage to the connection area or heat shrink tubes, with a suitable temperature being approximately 150 degrees F. The over mold 242 is then allowed to cool and the connection area is removed from the mold. The over mold can have many different diameters, with a preferred over mold having substantially the same or smaller diameter as the RGB LED unit. This over mold arrangement covers the connection area with a rugged plastic jacket and also makes the connection area waterproof and helps keep the connection area less susceptible to damage during installation in a spa. The over mold 242 also allows for better control over the diameter of the connection area.

Each of the RGB LED units also has a cap 260 that is arranged to be held on the LED control cable (240 in FIG. 12) at its narrow end 262 so that the cap can slide up and down the cable 264. The cap also has a wider end 266 that is arranged to fit closely over the RGB LED unit insertion point in the spa. When the cap is fit over the insertion point, the RGB LED unit is held in place.

Figure 13:
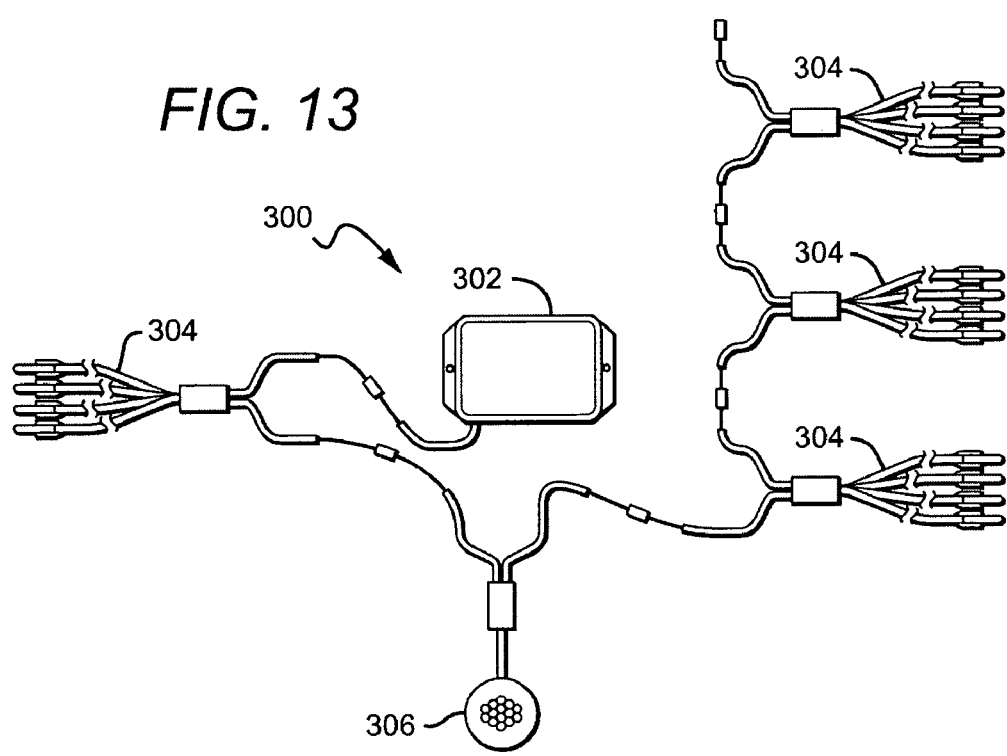
FIG. 13 is a plan view of one embodiment of a serially connected lighting system according to the present invention.

FIG. 13 shows another embodiment of a red, green and blue LED type lighting system 300 according to the present invention also having a central controller 302 comprising electronic components and software to generate lighting control signals. However, instead of being arranged as a hub and spoke system, it is arranged as a serial system. That is, the system 300 contains lighting subsystems 304 that are serially connected in a daisy chain, with the first of the subsystems connected to the central controller and the following subsystems connected in series. The system 300 can also have one or more RGB lights 306 similar to light 20 shown in FIG. 1 and described above, connected with the subsystems 304 in the daisy chain.

Figure 14:
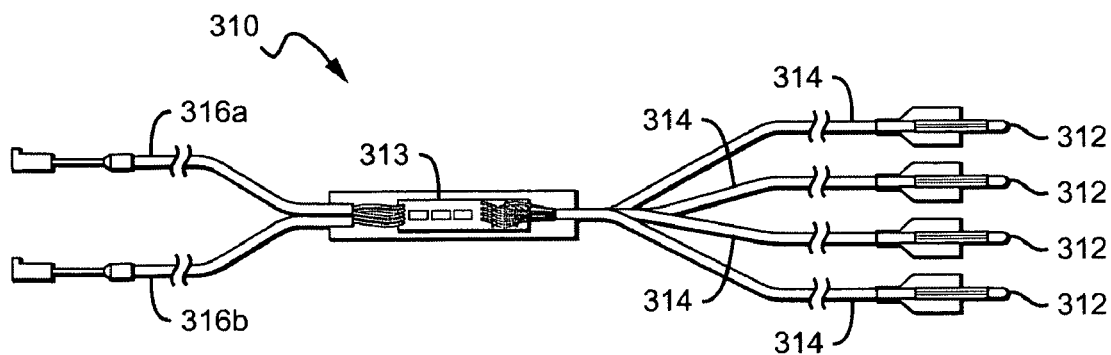
FIG. 14 is a plan view of one embodiment of a four RGB LED lighting subsystem according to the present invention that can be used in the lighting system of FIG. 13.
Figure 15:
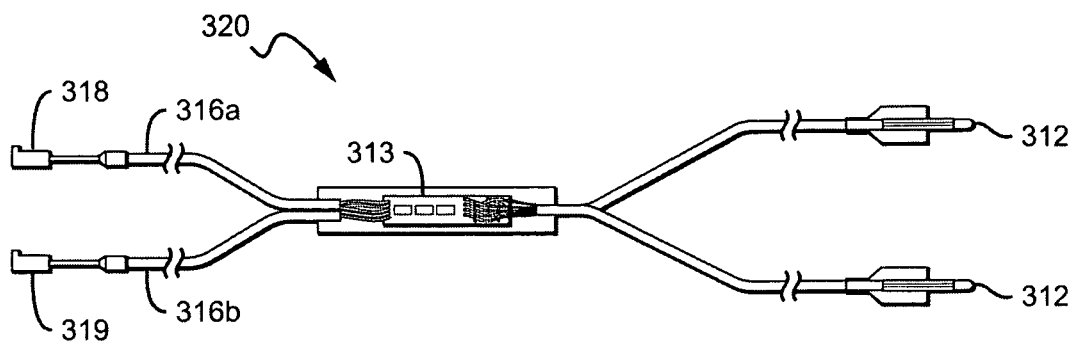
FIG. 15 is a plan view of one embodiment of a two RGB LED lighting subsystem according to the present invention that can be used in the lighting system of FIG. 13.
Figure 16:
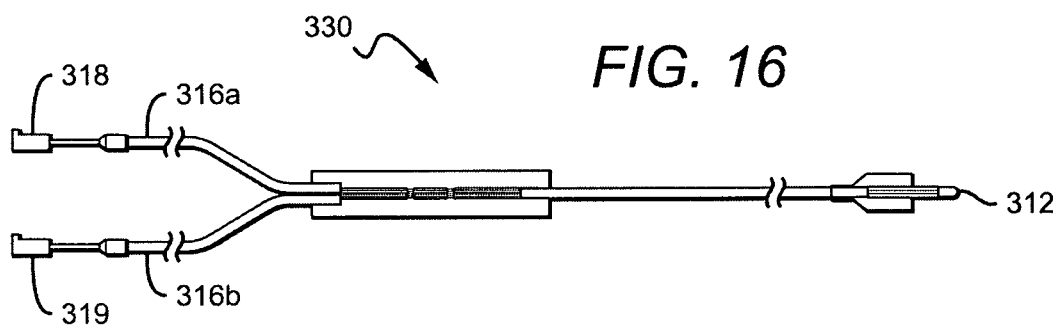
FIG. 16 is a plan view of one embodiment of a four RGB LED subsystem according to the present invention that can be used in the lighting system of FIG. 13.

FIGS. 14-16 shown different embodiments of subsystems 310, 320, 330, respectively, each of which is particularly adapted for use in a daisy-chain lighting system 300. Subsystem 310 is arranged with four RGB LED units 312, subsystem 320 is arranged with two RGB LED units 312, and subsystem 330 is arranged with a single RGB LED unit 312. The subsystem 310 is arranged in much the same way as subsystem 210 in FIG. 10 and has a PCB 313 that accepts central controller signals and generates signals carried on LED unit control cables 314 for the RGB LED units 312. The subsystem 310 can comprise different components and interconnections to generate the desired control signals to the RGB LED units 312, with preferred subsystems having the components and interconnects as described above and shown in FIGS. 5-7.

Instead of having only a control line cable from the central controller to the PCB 313, the subsystem 310 comprises a first control line cable 316*a* that carries control signals from either the central controller 302 or the previous subsystem 310 in the daisy chain. The subsystem also has second control line cable 316*b* for carrying control signals to the next subsystem 312 in the daisy chain. If it is the last subsystem in the daisy chain, the second cable 316*b* can be left unconnected. The subsystem 312 also utilizes male and female connectors 318, 319 with one of the male and female connectors being on the first cable 316*a* and the other being on the second cable 316*b*. By utilizing male and female connectors, the subsystems can more easily be correctly connected in a daisy-chain.

Subsystem 320 in FIG. 15 comprises two RGB LED units and the primary difference with subsystem 210 is that because the subsystem 320 comprises only two serially connected RGB LED units 312 only one set of electronic components is needed on the PCB 313 and only two LED control line sets 314 are needed. The subsystem 320, however, can have similar first and second control line cables 316*a*, 316*b* and similar male and female connectors 318, 319 to allow the subsystem to be arranged in a daisy chain.

Subsystem 330 in FIG. 16 comprises a single RGB LED unit 312 that is arranged much the same way as subsystem 230 in FIG. 12. The subsystem 330, however, is arranged with first and second control line cables 316*a*, 316*b* and similar male and female connectors 318, 319 to allow the subsystem to be arranged in a daisy chain.

The subsystems shown in FIGS. 10-13 and 14-16 each operate of four control lines from the central controller; red, green, blue and power. Accordingly, the subsystems are particularly adapted for use with electronic components and interconnects as shown in FIG. 7. It is understood, however, that the subsystems can equally be used with other components and interconnects and the corresponding control lines.

It should be understood that different embodiments of lighting systems according to the present invention can serially connect more than two RGB LED units and can have more than two groups of serially connected RGB LED units. It should also be understood that the LEDs in the RGB LED units can be illuminated at different intensities according to the present invention and different LED units can have LEDs that emit different colors of light other than red, green and blue. The lighting systems according to the present invention can have lighting units that emit the same color of light or can have units emitting different colors of light.

The number of RGB LED units that can be driven by the central controller is primarily related to the voltage and current driving the units from the central controller. In one embodiment, the signal from the central controller is 12v DC at 1 amp, which allows the central controller to drive 32 RGB LED units and a LED light (20 in FIG. 1), or other similar combinations of RGB LED units and lights.

The lighting systems according to the present invention can be used in many different applications, can include many different LEDs that emit different colors of light and the LEDs can be controlled to emit different lighting effects. For example, the systems can include ultra violet (UV) emitting LEDs, with a suitable UV LED having a peak emission wavelength of 395 nanometers (nm). A UV die can be included in the spa components and when these components are used in conjunction with a UV emitting LEDs, a glowing effect is created from the spa components. UV LEDs can also be used with RGB LEDs to create other interesting lighting effects. The signals on control lines to each of the systems according to the present invention can also be controlled to cause a rapid flashing of the LEDs or can be controlled to vary the luminous flux of the LEDs. Many other effects can be created by manipulating the signals on the control lines.

Figure 17:
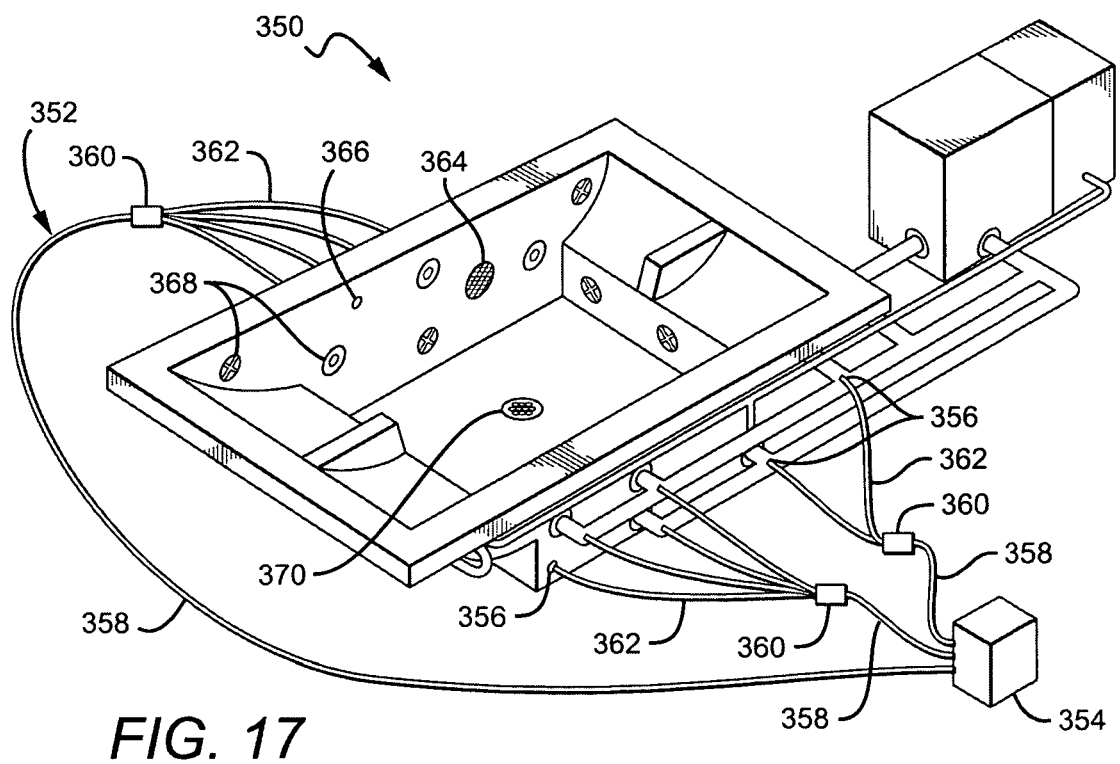
FIG. 17 is a perspective view of one embodiment of a spa using one embodiment of an RGB LED lighting system according to the present invention.

FIG. 17 shows one embodiment of a spa 350 that can utilize one or more lighting systems 352 according to the present invention, with the lighting systems either being a hub and spoke or serial connected type. The spa comprises a central controller 354 that controls the illumination of the red, green and blue LEDs in each RGB LED unit 356 in each of the lighting systems 352. Each of the lighting systems 352 is connected to the central controller 354 and control lines 358 carry signals from the central controller 354 to each PCB 360. Each PCB 360 contains the invert and switching circuitry, or FETs, along with the interconnections as described above. LED control line cable 362 carry signals from each PCB 360 to its respective RGB LED units 356 to illuminate the desired red, green and/or blue LED. RGB LED units 356 can be used to illuminate the interior of the spa 350 through different spa components including spa flood lights 364, point lights 366, jets 368, drains 370, skimmers, etc. Each of the RGB LED units 356 can be held in place at its spa component by many different methods such as an adhesive, epoxy, clip, or cap 260 (shown in FIG. 10).

Although the present invention has been described in considerable detail with reference to certain preferred configurations, other versions are possible. The invention can be used in spas, pools, tubs and the like. Different spa, pool or tub components can use the invention for water illumination. Therefore, the spirit and scope of the appended claims should not be limited to the preferred versions described above.

I claim:

1. A lighting system, comprising:
    a central controller for generating control signals;
    one or more lighting subsystems each of which accepts said control signals from said controller, each of said subsystems comprising;
    a plurality of lighting units, each of which comprises a plurality of light emitting diodes (LEDs) each being a different type emitting a different color of light, each of said lighting units comprising the same LED types emitting the same colors of light, said plurality of lighting units having at least first and second lighting units; and
    electronic circuitry comprising a plurality of switches, each of said LEDs in said first lighting unit connected between a drive voltage and a respective one of said switches, said switches also connected to a node, said node comprising a serial connection between said first and second lighting units, each of said LEDs in said second lighting unit connected to said node, said control signals closing the desired ones of said switches and applying the appropriate signal to said LEDs in said second of said lighting units to cause one or more corresponding type of said LEDs in said lighting units to emit light.

2. The lighting system of claim 1, wherein each of said subsystems is coupled directly to said central controller and accepts said control signals directly from said controller.

3. The lighting system of claim 1, wherein each of said subsystems are coupled together in a daisy chain, the first of said subsystems in said daisy chain connected directly to said controller and accepting said control signals, said control signals carried to each of said subsystems along said daisy chain.

4. The lighting system of claim 1, further comprising a printed circuit board (PCB) in each of said subsystems, said electronic circuitry arranged on said PCB.

5. The lighting system of claim 1, wherein said switching circuitry comprises an integrated circuit having a plurality of switches.

6. The lighting system of claim 1, wherein said switching circuitry comprises a plurality of transistors.

7. The lighting system of claim 1, wherein one or more of said LEDs in each of said lighting units emits light in the ultra violet (UV) wavelength spectrum.

8. The lighting system of claim 1, wherein said controller generates control signals to cause flashing of at one or more of said LEDs in said lighting units.

9. The lighting system of claim 1, wherein said controller generates control signals to drive said LEDs in said lighting units to different intensities.

10. A lighting system, comprising:
a central controller for generating control signals;
one or more lighting subsystems each of which accepts said control signals from said controller, each of said subsystems comprising;
first and second lighting units connected in series, each of which comprises a plurality of light emitting diodes (LEDs) each being a different type and emitting different colors of light, each of said lighting units having a power lead and a respective lead from each of its said LEDs and each said lighting units comprising similar types of LEDs emitting the similar colors of light;
electronic circuitry, some of which is arranged between said first and second serially connected lighting units, said electronic circuitry accepting said controller control signals corresponding to power and each of said type of said LEDs, said control signals and electronic circuitry arranged to cause one or more pairs of corresponding LEDs types in said lighting units to emit light.

11. The lighting system of claim 10, wherein said LED types correspond to three different LED types, said control signals comprise four signals, each for a respective one of said LED types, and a power signal.

12. The lighting system of claim 10, wherein said electronic circuitry arranged between said first and second serially connected units comprises a plurality of switches each of which is coupled between a respective one said LED leads in said first unit and said power lead in said second unit.

13. The lighting system of claim 12, wherein said power lead of said first unit is coupled to a power signal and said LED leads in said second unit are coupled to a respective one of said LED type control lines.

14. The lighting system of claim 13, wherein the desired one of said switches are closed by said electronic circuitry and the desired control signals applied to the desired one of said LED type control lines to cause one or more of the corresponding types of LEDs to emit light.

15. The lighting system of claim 10, wherein each of said subsystems is coupled directly to said central controller and accepts said control signals directly from said controller.

16. The lighting system of claim 10, wherein each of said subsystems are coupled together in a daisy chain, the first of said subsystems in said daisy chain connected directly to said controller and accepting said control signals, said control signals carried to each of said subsystems along said daisy chain.

17. The lighting system of claim 10, wherein said switching circuitry comprises an integrated circuit having a plurality of switches.

18. The lighting system of claim 10, wherein said switching circuitry comprises a plurality of transistors.

19. A lighting subsystem, comprising:
control lines each of which accepts one of a plurality of control signals from a controller;
first and second lighting units connected in series, each of which comprises a plurality of light emitting diodes (LEDs) each being a different type and emitting different colors of light, each of said lighting units having a power lead and a respective lead from each of its said LEDs and each said lighting units comprising similar types of LEDs emitting at similar colors of light; and
electronic circuitry, some of which is arranged between said first and second serially connected lighting units, said electronic circuitry accepting said control signals on said control lines, said control signals corresponding to power and each of said type of said LEDs, said control signals and electronic circuitry arranged to cause one or more pairs of corresponding LEDs types in said lighting units to emit light.

20. The lighting system of claim 19, wherein said LED types correspond to three different LED types, said control signals comprise three signals, each for a respective one of said LED types, and a power signal.

21. The lighting system of claim 19, wherein said electronic circuitry arranged between said first and second serially connected units comprises a plurality of switch each of which is coupled between a respective one said LED leads in said first unit and said power lead in said second unit.

22. The lighting system of claim 21, wherein said power lead of said first unit is coupled to a power signal and said LED leads in said second unit are coupled to a respective one of said LED type control lines.

23. The lighting system of claim 22, wherein the desired one of said switches are closed by said electronic circuitry and the desired said control signals applied to the desired one of said LED type control lines to cause one or more of the corresponding types of LEDs to emit light.

24. A system for illuminating a reservoir of water, comprising:
a reservoir shell capable of holding water;
one or more reservoir components extending through said reservoir shell;
a central controller for generating control signals;
one or more lighting subsystems each of which accepts said control signals from said controller, each of said subsystems comprising;
first and second lighting units to provide light to said reservoir through at least one of said reservoir components, said lighting units connected in series, each of which comprises a plurality of light emitting diodes (LEDs) each being a different type and emitting different colors of light, each of said lighting units having a power lead and a respective lead from each of its said LEDs and each said lighting units comprising similar types of LEDs emitting at similar colors of light; and electronic circuitry, some of which is arranged between said first and second serially connected lighting units, said electronic circuitry accepting said control signals on said control lines, said control signals corresponding to power and each of said type of said LEDs, said control signals and electronic circuitry arranged to cause one or more pairs of corresponding LEDs types in said LED units to emit light.

25. The system of claim 24, wherein one or more of said LEDs in each of said lighting units emits light in the ultra violet (UV) wavelength spectrum.

26. The system of claim 25, further comprising a UV die in at least one of said reservoir components that cooperates with said UV light to create a glowing effect from said reservoir components.

* * * * *